E. MOSS.
POURING ATTACHMENT TO TINS, CANS, AND THE LIKE.
APPLICATION FILED JAN. 12, 1916.
1,264,960.
Patented May 7, 1918.
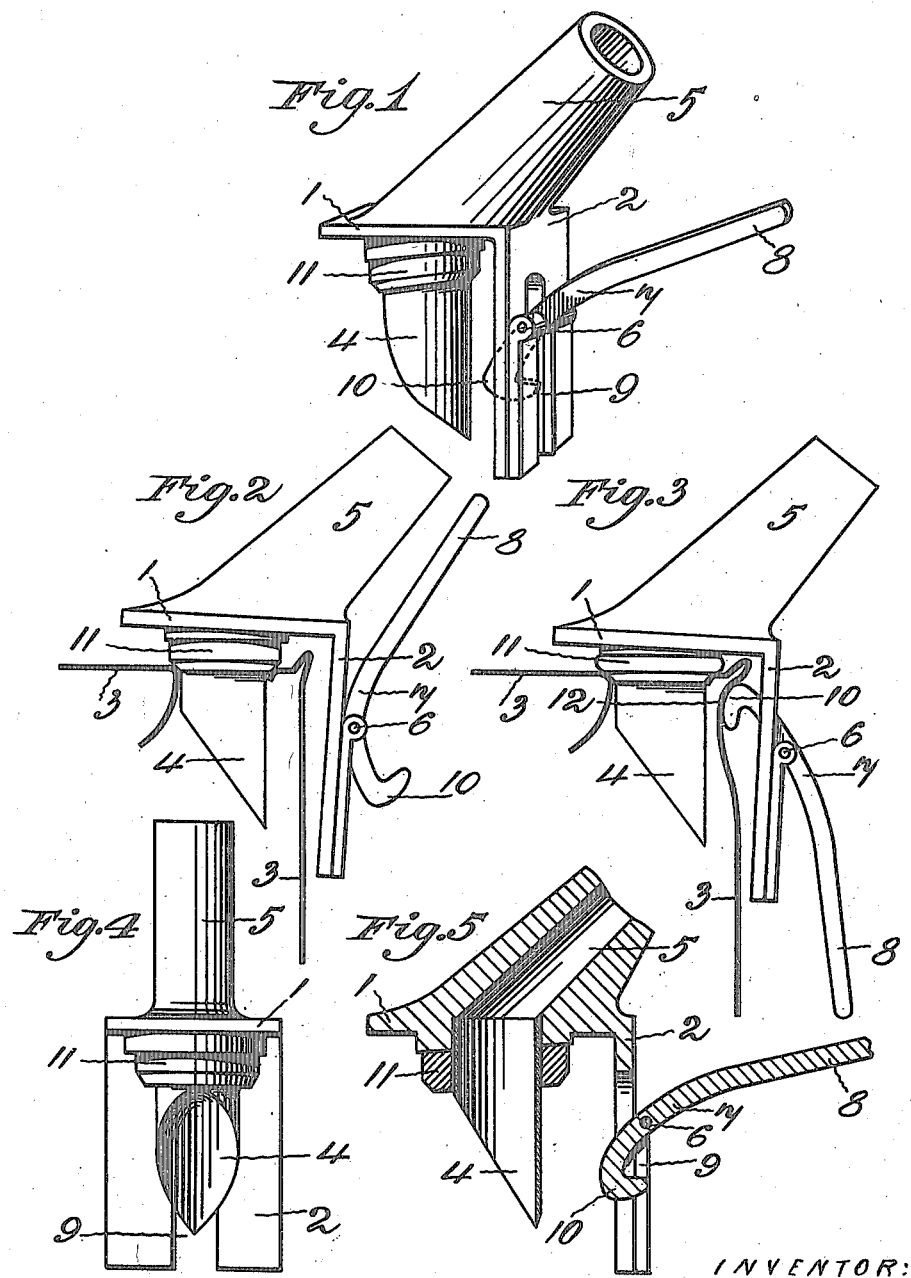

UNITED STATES PATENT OFFICE.

ERNEST MOSS, OF CHRISTCHURCH, NEW ZEALAND.

POURING ATTACHMENT TO TINS, CANS, AND THE LIKE.

1,264,960.

Specification of Letters Patent.

Patented May 7, 1918.

Application filed January 12, 1916. Serial No. 71,653.

*To all whom it may concern:*

Be it known that I, ERNEST MOSS, a subject of the King of Great Britain, residing at 486 Retreat road, Dallington, Christchurch, in the Dominion of New Zealand, have invented new and useful Improvements in Pouring Attachments to Tins, Cans, and the like, of which the following is a specification.
This invention relates to an attachment to tins, cans, and the like for use in pouring out liquid contents, the object of the present invention being to provide an inexpensive and reliable appliance for this purpose.
Hitherto, in appliances of this nature, it has been found necessary, in order to effect a liquid-tight joint with the tin, to resort to somewhat complicated and expensive means for clamping the device upon the tin.
The present invention therefore seeks to overcome this objection by providing a convenient and inexpensive construction for this purpose.

In order that the nature of the invention and its construction may be fully understood, reference will now be made to the accompanying sheet of drawings in which;—

Figure 1— is a perspective view of the device,

Fig. 2— is a side view showing the device in position upon the tin in readiness for clamping.

Fig. 3— is a similar view showing the device in its clamped position, and illustrating the operation of the clamping means, Fig. 4— is a rear view of the device, and Fig. 5— is a sectional elevation through Fig. 4, at right angles thereto.
In carrying the invention into effect the construction comprises a rigid angle-plate consisting of two members 1 and 2 adapted to embrace one of the corners or angles of the tin 3. Projecting from the inner face of the member 1 is a short nozzle 4 so formed at its extremity as to be capable of piercing its way through the metal of the tin 3, as shown in Figs. 2 and 3, such nozzle being adapted to provide communication between the contents of the tin and a suitable pouring spout 5 projecting at a suitable angle from the outer face of the member 1.

If thought necessary or desirable any suitable means may be employed for closing the spout when desired, such closing means comprising any of the well-known devices such as for instance a cork, a tap, a valve or the like.

To secure the device in place on the tin 3, upon the other member 2 of the angle-plate is pivoted, as by means of a pin 6, a lever 7, one end 8 of which projects outwardly, while the other end of such lever projects through a slot 9 in the said member and is so formed as to constitute a cam 10 adapted to engage the coinciding portion of the tin and so serve as a means of clamping the device upon the tin in such a manner as to effect a liquid-tight joint between the latter and the portion of the angle-plate around the nozzle 4, as clearly shown in Fig. 3.

In order that a satisfactory joint may be made in this manner, a ring or washer 11 of soft rubber or other suitable material, is provided to encircle the base of the said nozzle, such washer being preferably beveled or tapered at its lower end as shown. By this arrangement, as the device is clamped in place in the manner described, the washer will be compressed between the inner face of the member 1 of the angle-plate and the surface of the tin, which action causes the beveled portion of the washer to slightly enter between the nozzle and the edges of the tin around the hole and so insure a perfectly liquid-tight joint.

In practice the device is first placed in the desired position upon the tin, the lever 7 being placed as shown in Fig. 2 with the end 8 upward. Sufficient pressure is then applied to the device to cause the nozzle to pierce its way through the metal as shown in Fig. 2. Upon now depressing the end 8 of the lever the cam 10 will move upward in contact with the side of the tin and form an indentation 12 therein, which formation allows of the cam obtaining a firm grip below the bead or rim of the tin and so enabling the device to be securely clamped down by the remainder of the movement of the lever, as shown in Fig. 3.

I claim:

1. A pouring attachment for cans and the like, comprising an angle-plate adapted to embrace a corner of the can, a nozzle projecting inward from one member of the angle-plate and adapted to pierce the contiguous can wall, a pouring spout projecting outward from the angle-plate and being in communication with the nozzle, and a clamping member carried by the other member of the angle-plate and having a gripping portion adapted to move inwardly from the latter member and toward the first member so as to approach the point where the nozzle joins the same.

2. A pouring attachment for cans and the like, comprising an angle-plate adapted to embrace a corner of the can, a nozzle projecting inward from one member of the angle-plate and adapted to pierce the contiguous can wall, a washer of compressible material surrounding the nozzle and abutting the said member, a pouring spout projecting outward from the angle-plate and being in communication with the nozzle, and a clamping member carried by the other member of the angle-plate and having a gripping portion adapted to move inwardly from the latter member and toward the first member so as to approach the position of the washer.

3. A pouring attachment for cans and the like, comprising an angle-plate adapted to embrace a corner of the can, a nozzle projecting inward from one member of the angle-plate and adapted to pierce the contiguous can wall, a pouring spout projecting outward from the angle-plate and being in communication with the nozzle, and a clamping lever pivoted on the other member of the angle-plate and having a gripping arm adapted to move inwardly from the latter member and toward the first member into operative position wherein it is disposed near to the first member at the point where the nozzle joins the same.

In testimony whereof I have signed my name to this specification in the presence of two subscribing witnesses.

ERNEST MOSS.

Witnesses:
PERCY RICHMOND CHINIE,
SIDNEY JAMES TREHAVEN.